United States Patent
Oosawa et al.

(10) Patent No.: US 9,528,200 B2
(45) Date of Patent: Dec. 27, 2016

(54) METHOD FOR MANUFACTURING REINFORCING FIBER STRAND

(71) Applicant: Teijin Limited, Osaka-shi, Osaka (JP)

(72) Inventors: Yukino Oosawa, Matsuyama (JP);
Makoto Ootsubo, Matsuyama (JP);
Takeru Ooki, Matsuyama (JP);
Katsuyuki Hagihara, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 227 days.

(21) Appl. No.: 14/367,248

(22) PCT Filed: Dec. 21, 2012

(86) PCT No.: PCT/JP2012/083292
§ 371 (c)(1),
(2) Date: Jun. 20, 2014

(87) PCT Pub. No.: WO2013/094742
PCT Pub. Date: Jun. 27, 2013

(65) Prior Publication Data
US 2015/0259832 A1   Sep. 17, 2015

(30) Foreign Application Priority Data
Dec. 22, 2011  (JP) .................................. 2011-281507

(51) Int. Cl.
*D02J 1/18*   (2006.01)
*B29C 70/10*  (2006.01)
(Continued)

(52) U.S. Cl.
CPC .................. *D02J 1/18* (2013.01); *B29C 70/10* (2013.01); *D01F 9/12* (2013.01); *D04H 1/4218* (2013.01);
(Continued)

(58) Field of Classification Search
CPC .................. D02J 1/18; D02J 1/20; D02J 1/06; D02J 1/16; D02J 1/226; D02J 1/228; D02J 3/02; D02J 11/00; D01D 11/02; D02G 1/006; D02G 1/008; D01G 9/00; D01G 9/06; D01G 9/12; D01G 9/16; D01G 99/005; B29C 70/10; D01F 9/12; D04H 3/002; D04H 1/4218; D04H 1/4242; D04H 1/70; D04H 3/004
(Continued)

(56) References Cited

U.S. PATENT DOCUMENTS 3,032,829 A * 5/1962 Mahoney ............. A24D 3/0204
                                                    19/65 T
3,144,025 A * 8/1964 Erlich ...................... A24D 3/08
                                                    131/332
(Continued)

FOREIGN PATENT DOCUMENTS

FR   2581086 A1   10/1986
FR   2761380 A1   10/1998
(Continued)

OTHER PUBLICATIONS

English language machine translation of JP 2000-136457 A, pub. May 2000.*

(Continued)

*Primary Examiner* — Amy Vanatta
(74) *Attorney, Agent, or Firm* — Banner & Witcoff, Ltd.

(57) ABSTRACT

A method for manufacturing a reinforcing fiber strand is provided, in which a strand including reinforcing fibers passes through an uneven jig and a widening jig in this order, the uneven jig including a plurality of uneven portions having notched and protrusion portions, and the strand is divided by the protruding portions.

10 Claims, 8 Drawing Sheets

(51) Int. Cl.
  *D04H 3/002*     (2012.01)
  *D04H 1/4218*    (2012.01)
  *D04H 1/4242*    (2012.01)
  *D04H 1/4342*    (2012.01)
  *D04H 1/70*      (2012.01)
  *D04H 3/004*     (2012.01)
  *D04H 3/009*     (2012.01)
  *D01F 9/12*      (2006.01)

(52) U.S. Cl.
  CPC .......... *D04H 1/4242* (2013.01); *D04H 1/4342* (2013.01); *D04H 1/70* (2013.01); *D04H 3/002* (2013.01); *D04H 3/004* (2013.01); *D04H 3/009* (2013.01)

(58) Field of Classification Search
  USPC .............................................. 28/282; 19/65 T
  See application file for complete search history.

(56) References Cited

U.S. PATENT DOCUMENTS

| | | | | |
|---|---|---|---|---|
| 3,156,016 A * | 11/1964 | Dunlap | ................... | D02J 1/18 156/166 |
| 3,384,944 A * | 5/1968 | Medeiros | ........................ | 28/282 |
| 3,440,689 A * | 4/1969 | Ishikura | ................... | D01G 1/10 28/282 |
| 3,708,832 A * | 1/1973 | Lohrke | .................. | D01G 99/00 28/282 |
| 5,101,542 A * | 4/1992 | Nakagawa | ........... | B65H 51/005 19/65 T |
| 6,385,828 B1 | 5/2002 | Kiss et al. | | |
| 6,585,842 B1 | 7/2003 | Bompard et al. | | |
| 7,571,524 B2 * | 8/2009 | Kawabe | .................. | B29C 70/20 28/282 |
| 2003/0172506 A1 | 9/2003 | Guirman et al. | | |
| 2004/0043213 A1 * | 3/2004 | Tonon | ................... | B29B 15/125 428/367 |
| 2006/0085958 A1 * | 4/2006 | Oishibashi | ........... | B65H 51/005 28/282 |
| 2010/0107384 A1 * | 5/2010 | Meyer | ....................... | D02J 1/18 28/282 |
| 2012/0213997 A1 * | 8/2012 | Wang | ..................... | B29C 70/12 428/398 |

FOREIGN PATENT DOCUMENTS

| | | |
|---|---|---|
| FR | 2826672 A1 | 1/2003 |
| GB | 2175614 A | 12/1986 |
| JP | S44-021506 | 9/1969 |
| JP | S46-043275 | 12/1971 |
| JP | S49-071220 | 7/1974 |
| JP | S56-43435 A | 4/1981 |
| JP | S57-77342 A | 5/1982 |
| JP | H01-282362 A | 11/1989 |
| JP | H03-146736 A | 6/1991 |
| JP | 2000-136457 A | 5/2000 |
| JP | 3049225 B2 | 6/2000 |
| JP | 2007-313697 A | 12/2007 |

OTHER PUBLICATIONS

Sep. 2, 2015—(CN) Office Action—App 201280063968.8—Eng Tran.
Nov. 25, 2014—(JP) Office Action—App 2013-550358.
International Search Report issued in corresponding International Application No. PCT/JP2012/083292 mailed Apr. 2, 2013.
Apr. 2, 2013—(JP) Written Opinion of ISR—App PCTJP2012083292—Eng Tran.
Aug. 3, 2015—(EP) Supplementary Search Report—App 12860793.4.
May 3, 2016—(CN) Office Action—App 201280063968.8—Eng Tran.

\* cited by examiner

METHOD FOR MANUFACTURING REINFORCING FIBER STRAND

CROSS REFERENCE TO RELATED APPLICATIONS

This is a U.S. National Phase Application under 35 U.S.C. §371 of International Application No. PCT/JP2012/083292, filed Dec. 21, 2012, which claims priority to Japanese Application No. 2011-281507 filed Dec. 22, 2011, which was published Under PCT Article 21(2), the entire contents of which are incorporated herein by reference.

TECHNICAL FIELD

The present invention relates to a reinforcing fiber strand, and, more particularly, a method for manufacturing a widened reinforcing fiber strand, which is suited for a fiber-reinforced composite material.

BACKGROUND ART

Heretofore, as a method for widening a strand, there are known a method in which a water current or high-pressure air flow hits a reinforcing fiber strand to spread the constituting fibers in the width direction, a method in which a strand is vibrated by ultrasonic waves or the like to be widened in the air or liquid, and a method in which a strand makes contact with a widening jig to be extended and widened.

For example, Patent Document 1 or Patent Document 2 is known as the method of using the water current or high-pressure air flow. However, there is a problem that if water is used for fluid, large energy is required for a drying process after the strand is widened. When using absorption high-pressure air flow, a large number of supplementary facilities are undesirably needed due to scale-up resulting from the use of multiple spindles or speed up. In contrast, as in Patent Documents 3 to 5, the method of vibrating and widening the strand may be implemented by a relatively small device. However, the method of using such a vibrating jig is problematic in that a frequency is insufficient if a specific line speed is exceeded, so that it is impossible to obtain a sufficient width of strand.

Therefore, industrially, the method of making the widening jig contact with the strand is advantageous in that facility investment is relatively small and efficient production is possible. For example, Patent Document 6 discloses a method of uniformly and sufficiently widened reinforcing fiber strand by using a curved bar with a convex curved surface and a curved bar with a concave curved surface. However, this is problematic in that the tension of the strand is changed in the process, so that a center of the strand deviates from a center of the convex curved surface, and thereby the strand is non-uniformly widened.

RELATED ART DOCUMENTS

Patent Documents

Patent Document 1: Japanese Patent Laid-Open Publication No. S57-77342
Patent Document 2: Japanese Patent No. 3049225
Patent Document 3: Japanese Patent Laid-Open Publication No. S56-43435
Patent Document 4: Japanese Patent Laid-Open Publication No. H1-282362
Patent Document 5: Japanese Patent Laid-Open Publication No. 2007-313697
Patent Document 6: Japanese Patent Laid-Open Publication No. H3-146736

SUMMARY OF INVENTION

Problems to be Solved by Invention

Accordingly, an object of the present invention is to provide a method for manufacturing a reinforcing fiber strand, which uses a simple mechanism and by which the strand is stably widened under a high-speed processing condition.

Means for Solving the Problems

A method for manufacturing a reinforcing fiber strand according to the present invention is characterized in that a strand including reinforcing fibers passes through an uneven jig and a widening jig in this order, the uneven jig including a plurality of uneven portions having notched and protrusion portions, and the strand is divided by the protruding portions. Preferably, the uneven jig may be a jig having an uneven portion of a height that is 0.01 to 10 times of a strand thickness, or the strand may pass through a convergence jig before the uneven jig. In the present invention, a strand delivering distance L, which is a distance between the uneven jig and the widening jig, may preferably satisfy the following Inequality (1):

$$L \leq 20 \times W \qquad (1)$$

wherein L is the strand delivering distance (mm) between the uneven jig and the widening jig, and W is a fiber strand width (mm) before the strand is widened.

Preferably, the widening jig may be a jig having one convex portion, or a second uneven jig may be provided behind the widening jig. Preferably, according to the present invention, the reinforcing fibers may be carbon fibers, and the strand width before the strand is widened may range from 1 mm to 300 mm. Preferably, the jig may be a roll or a pin, and the convergence jig may be a jig forming one concave portion.

Effect of Invention

According to the present invention, it is possible to provide a method for manufacturing a reinforcing fiber strand, which uses a simple mechanism and by which the strand is stably widened under a high-speed processing condition.

DESCRIPTION OF REFERENCE NUMERALS OF IMPORTANT PARTS

Figure 1:
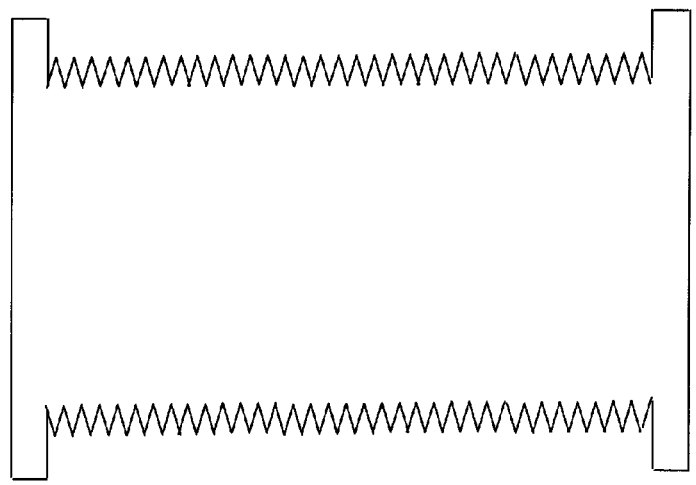
FIG. 1 is a schematic view showing an uneven jig.

1. Convergence jig
2. Uneven jig
3. Widening jig
4. Rotary-cutter main body
5. Rubber roller
6. Thread guide of reinforcing fiber
7. Guide mechanism
8. Strand pulling tension at the time of entering widening jig
9. Reaction force of strand pulling tension serving as trajectory adjusting force

EMBODIMENTS FOR CARRYING OUT THE INVENTION

The present invention is directed to a method for manufacturing a reinforcing fiber strand, in which a strand including reinforcing fibers passes through an uneven jig and a widening jig in this order, the uneven jig including a plurality of uneven portions having notched and protrusion portions, and the strand is divided by the protruding portions. The plurality of protrusion portions of the uneven jig functions to divide the strand into a plurality of portions in a direction (width direction) perpendicular to a travelling direction thereof. Consequently, a fiber bundle (strand) is once separated in the width direction. Thereafter, even after the strand passes through the widening jig, the strand divided into a small fiber bundle can maintain a state wherein both weak bonding and strong bonding exist between single fibers. In the method for manufacturing the reinforcing fiber strand according to the present invention, the strand including reinforcing fibers is finally divided into small fiber bundles by the protrusion portions of the uneven jig.

Figure 2:
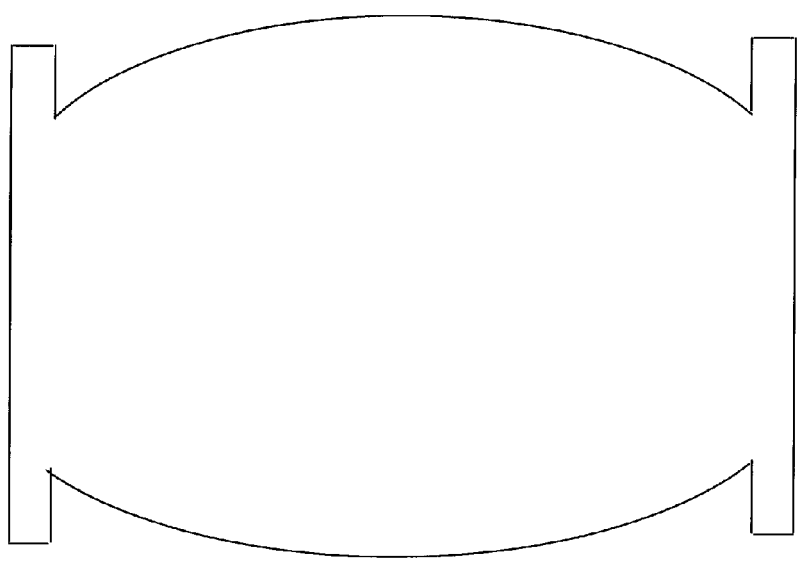
FIG. 2 is a schematic view showing a widening jig.
Figure 10:
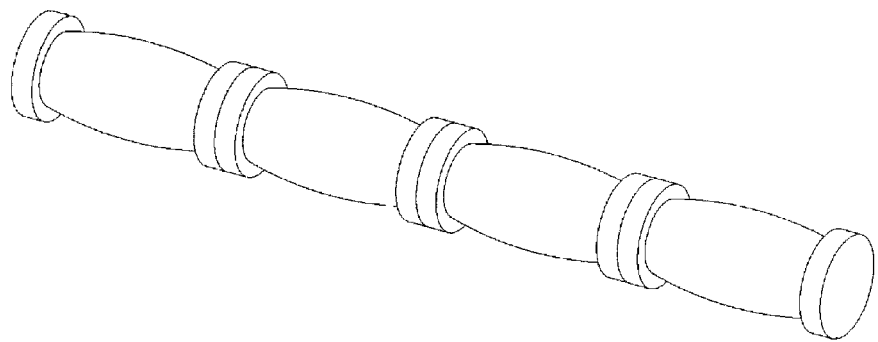
FIG. 10 is a view showing a plurality of widening jigs (convex jigs) arranged in a lateral direction.

The widening jig is not particularly limited, as long as it may widen the width of the fiber strand. However, it is preferable that the widening jig is a jig having one convex portion. More preferably, the widening jig is a jig having one gently sloped convex portion, as shown in FIG. 2. That is, the widening jig is preferably a jig of a so-called drum-shaped (in detail, a Japanese-style drum-shaped or barrel-shaped) jig (hereinafter, referred to as a convex jig). Such a jig is connected in a longitudinal direction as shown in FIG. 10 to easily cope with the use of multiple spindles, so that it is especially advantageous when a mass production of the multiple spindles is done industrially.

In the manufacturing method of the present invention, it is preferable that a strand delivering distance L from the uneven jig to the widening jig is small. Preferably, this distance is at least equal to or less than 20 times of a width W of the fiber strand before it is widened.

The reinforcing fiber used in the present invention is not limited to a particular kind as long as the fiber is a high-strength fiber that may be used as a fiber-reinforced composite material. Preferably, exemplified are carbon fiber, glass fiber, basalt fiber, alumina fiber, boron fiber, steel fiber or the like as inorganic fiber, and aromatic polyamide fiber, PBO fiber, high-strength polyethylene fiber or the like as organic synthetic fiber. Among them, the carbon fiber is suitable for applying the manufacturing method of the present invention. As the carbon fiber, polyacrylonitrile (PAN)-based one, petroleum•coal pitch-based one, rayon-based one, lignin-based one, and others may be used. Especially, the PAN-based carbon fiber made of PAN is most suitable because it is superior in productivity in an industrial scale or mechanical properties.

The tensile strength of the reinforcing fiber is preferably in the range of 600 MPa to 12 GPa, and more particularly in the range of 3,000 to 10,000 MPa. Further, the strand tensile modulus of the reinforcing fiber is preferably in the range of 100 to 1,000 GPa, and more particularly in the range of 200 to 500 GPa.

As a diameter of the reinforcing fiber, a wide range of 1 μm to 30 μm may be adopted depending on the purpose of its use. This diameter is more particularly in the range of 3 to 10 μm to increase the reinforcing effect to matrix resin.

The strand including reinforcing fibers used in the present invention forms a bundle by gathering a plurality of single fibers. As to the number of the single fibers forming the bundle, a fiber bundle (strand) having fibers of 1,000 to 100,000 is preferred to definitely realize the widening effect of the present invention. Moreover, it is preferable that the number of the single fibers is in the range of 6,000 to 50,000. If the number of the single fibers is excessively small, the widening effect of the present invention tends to decrease. The total tex of the strand is preferably 30 tex to 500,000 tex, and more particularly 200 to 4,000 tex.

While the width of the strand varies depending on the diameter of the reinforcing fiber to be used, the width is preferably 0.1 to 10 mm and more particularly 0.5 to 5 mm, per 100 tex of the reinforcing fiber. Further, in terms of workability, the width of around one strand is preferably in the range of 1 mm to 300 mm, more preferably of 3 to 90 mm, and most preferably of 5 to 40 mm. The strands may constitute a bundle of fibers from the first at the time of being produced, and a plurality of strands may be gathered to be treated at one time. In the case of using the plurality of strands, it is preferable to supply them by multiple spindles. Depending on the number and width of supplied strands, each jig is extended in an axial direction to easily cope with the manufacturing method of the present invention.

The shape of the strand including reinforcing fibers used in the present invention is preferably a flat shape. It is preferably a rectangular, circular or elliptical shape without being limited to a particular shape. The thickness of the strand is preferably in the range of 0.01 mm to 20 mm, and particularly preferably of 0.02 mm to 10 mm. The thickness may be measured using a caliper or micrometer. The strand before being widened is usually converged by a sizing agent. For example, if such a strand includes carbon fibers, it is possible to easily measure the thickness. Even when it is difficult to perform such a measurement, it is possible to accurately measure the thickness by polishing a cutting section of a test piece obtained by impregnating the strand with resin, and then observing it using a microscope or the like.

Further, it is preferable that the reinforcing fiber strand used in the present invention is one to which the sizing agent is applied in a previous process. The adhesion amount of the sizing agent is preferably more than 0 parts by mass and 10 parts by mass or less based on 100 parts by mass of the fibers, and is more preferably 0.5 parts by mass to 5 parts by mass. The sizing agent is not limited to a particular kind, but is preferably a resin-based sizing agent that is the same as matrix resin, which is a target to be subsequently reinforced by the strand, in view of the physical properties of a composite material obtained. In addition, a sizing agent, containing a thermosetting or thermoplastic resin having a softening point, as a main agent is desirable. In the manufacturing method of the present invention, it is possible to process even a fiber strand, which is provided with such a sizing agent and is difficult to open, at high speeds.

Figure 8:
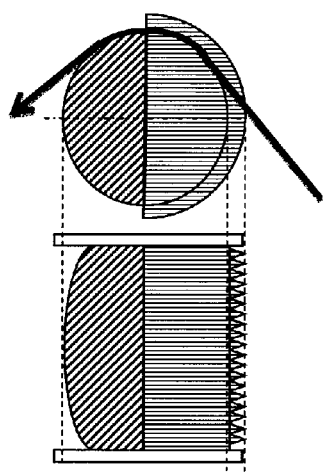
FIG. 8 is a view showing an example where the uneven jig and the widening jig are integrated with each other and L=0.

In the method for manufacturing the reinforcing fiber strand according to the present invention, a process of passing the strand including reinforcing fibers as mentioned above through the uneven jig and the widening jig in this order is essentially required. It is important for the uneven jig to have a plurality of uneven portions so as to form unevenness in fiber density in a direction perpendicular to the strand travelling direction. The uneven and widening jigs are preferably disposed so that the strand delivering distance L between them satisfies the following Inequality (1):

$$L \le 20 \times W \quad (1)$$

wherein L is the strand delivering distance (mm) between the uneven jig and the widening jig, and W is the fiber strand width (mm) before the strand is widened In the method for manufacturing the reinforcing fiber strand according to the present invention, the strand delivering distance L between the uneven and widening jigs is preferably small, and is preferably at least equal to or less than 20 times of the fiber strand width W before the strand is widened. Moreover, the strand delivering distance L is preferably 5 times or less and particularly preferably 2 times or less of the fiber strand width W. The lower limit of the distance L corresponds to a case where the uneven and widening jigs are integrated with each other, and the case where the distance L is substantially zero as in FIG. 8 is also desirable.

Figure 5:
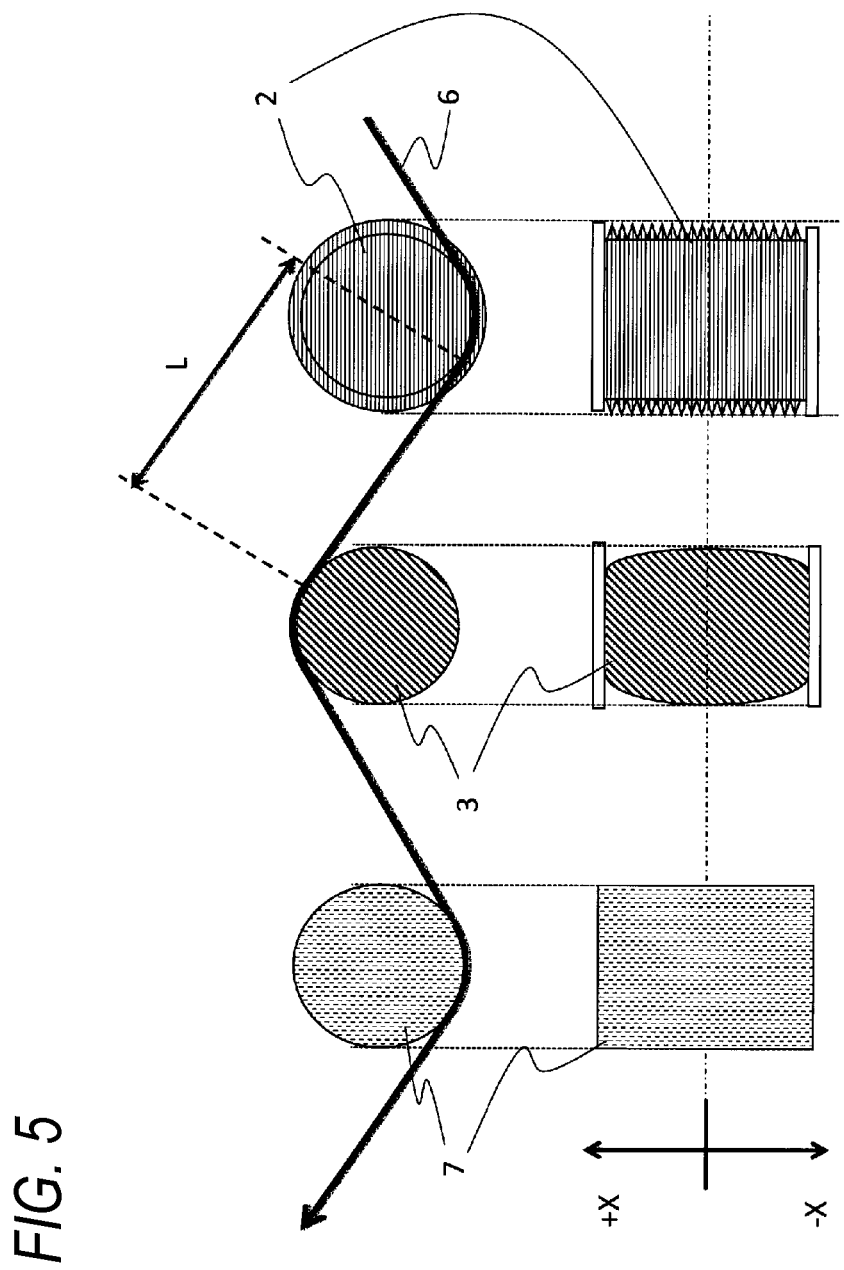
FIG. 5 is a schematic view illustrating a direction of tension acting on a reinforcing fiber.

In the present invention, the reinforcing fiber strand preferably passes sequentially through the uneven jig, the widening jig and the guide mechanism for stabilizing the thread guide of the strand. When the width of the stand is increased using the widening jig, a widthwise (X direction) component force is applied to the strand. For example, it is ideal that both the component forces of +X direction and −X direction as shown in FIG. 5 has magnitudes sufficient to widen the strand and both keep balance. If the component force of +X direction is extremely large, the entire strand is slanted in the +X direction, so that the strand does not tend to be widened uniformly and sufficiently.

In the widening jig, the strand itself preferably runs the center of the widening jig in order to keep a good balance between the +X direction component force and −X direction component force for the strand. Therefore, it is preferable to control the position and angle where the strand enters the widening jig, thus controlling the thread guide in the width direction of the strand.

In the position where the strand enters the widening jig, it is ideal that (i) the center of the strand runs the position of the center (X=0) on the widening jig, and (ii) the angle (strand entering angle) between the axis of the center (X=0) and the strand entering direction is 0 degree. However, when the process of widening the reinforcing fiber strand is performed at high speed industrially and continuously, it is difficult to always continuously satisfy the above mentioned (i) and (ii).

Figure 6:
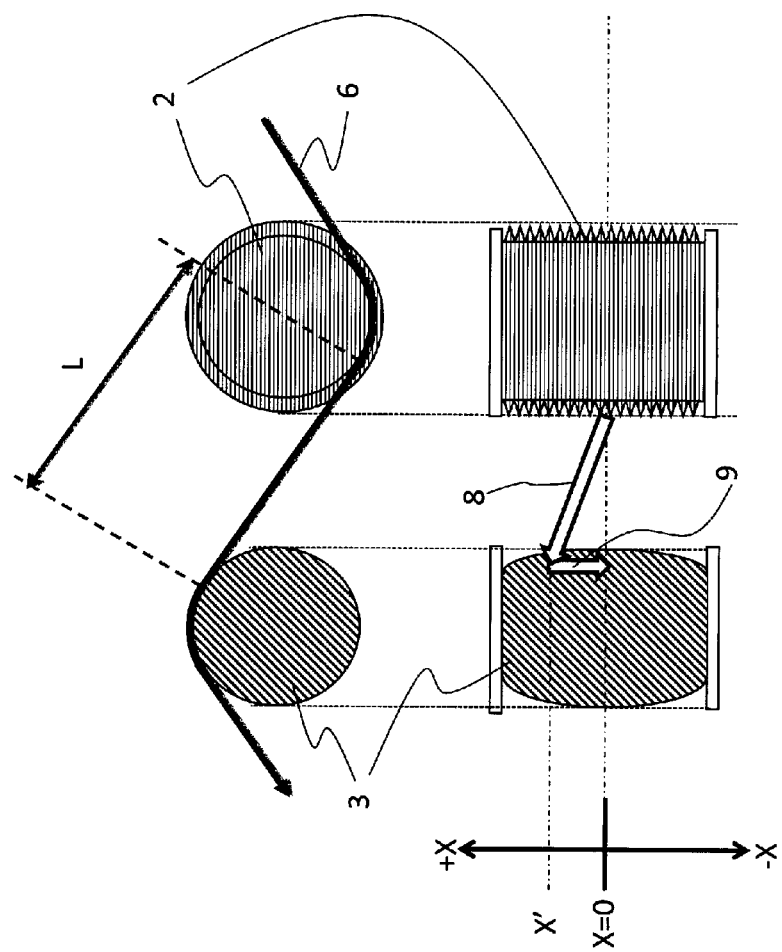
FIG. 6 is a view showing an example where a strand delivering distance L of the uneven jig and the widening jig is short.
Figure 7:
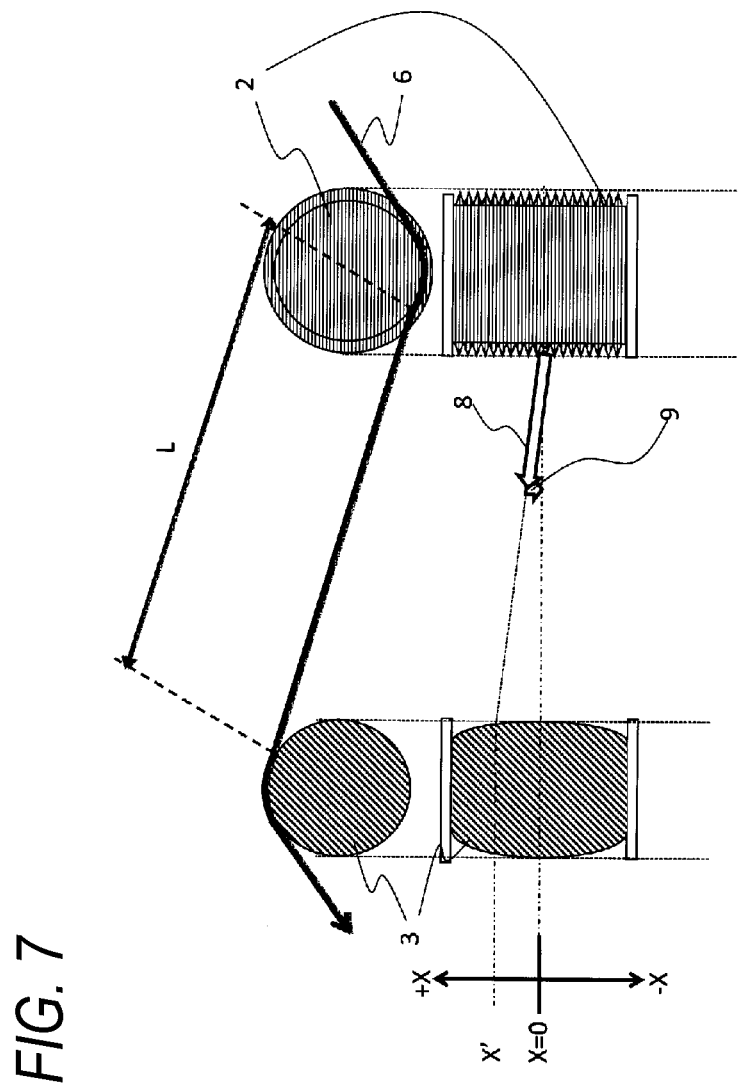
FIG. 7 is a view showing an example where the strand delivering distance L of the uneven jig and the widening jig is long.

In the present invention, if the reinforcing fiber strand passes sequentially through the uneven jig and the widening jig, the −X direction force (trajectory adjusting force) is applied to correct the thread guide even when the entire strand is slanted in the +X direction. Further, when the reinforcing fiber strand passes through the uneven jig, the widening jig and then the guide mechanism for stabilizing the thread guide of the strand, even if the entire strand is slanted in the +X direction on the widening jig as shown in FIG. 6 (the position X' entering the widening jig) for example, the guide mechanism acts as a support point for a thread guide deviation in the strand width direction, so that the reaction force in the −X direction is produced on the strand on the uneven jig in the X direction, and thus it is easy to use the reaction force as the trajectory adjusting force. In this regard, since the reaction force in the −X direction is the X-direction component force of the strand pulling tension acting in the axial direction of the fiber of the strand, the positional relationship between the uneven jig and the widening jig in the width direction of the strand satisfies the above Inequality (1), thus achieving a greater effect.

Therefore, the strand delivering distance L between the uneven jig and the strand widening jig is preferably small. In order to increase the X-direction component force of the strand pulling tension, it is more preferable that the distance L be equal to or less than 20 times of the strand width W. Moreover, the distance L is preferably 5 times or less of the width W, and is particularly preferably 2 times or less of the width W.

Such a configuration allows the trajectory to be easily corrected in a practical range even if the thread guide of the strand is deviated to some extent. As a conventional method of correcting the trajectory, there was proposed a method of detecting the deviation of the thread guide using a sensor or the like and of performing a feedback control. However, the method of the present invention obviates the necessity of a large-scale facility, so that it is possible to use multiple spindles and it is effective to realize an industrially stable production.

Further, it is preferable that the strand passes through the convergence jig once before passing through the uneven jig. Since the strand previously passes through the convergence jig, the strand passes through the more stable thread guide. Consequently, it is possible to reduce the influence of a process condition such as a change in tension.

Further, it is also preferable that the strand pass through a second uneven jig after passing through the widening jig. The strand undergoing the process passes through the uneven jig having the plurality of uneven portions again, so that it is possible to keep the widening state more uniformly even in the subsequent process.

The uneven jig used in the manufacturing method of the present invention is the jig that essentially has uneven portions disposed to generate unevenness in fiber density of the strand in the direction (width direction) perpendicular to the strand travelling direction. The uneven portions previously separate the strand including reinforcing fibers to stabilize the widening operation and to make the thread guide of the strand constant. As such, the uneven portions serve as the guide mechanism.

When the reinforcing fiber is usually widened, it is necessary to keep the thickness of the strand uniform with respect to the width direction of the strand. Hence, the use of the uneven jig as in the present invention has been avoided. The reason is because the reinforcing effect of the matrix resin is different between a portion of the composite material having a high fiber existence rate and a portion having a low fiber existence rate. However, the method of using the reinforcing fiber strand includes, in addition to the method of impregnating it with the matrix resin, a method of immersing the widened strand in the resin, performing a convergence operation, solidifying the resin and performing a cutting operation to be used as a pellet, a method of cutting the widened reinforcing fiber strand to be used in a random mat, etc. In these cases, it is particularly important to obtain the stable width and thickness for the entire strand in the middle of the process, and a local change in thickness in the width direction of the strand does not matter. It is rather recognized by the efforts of the inventors that a local change in thickness is preferable in the width direction if it is regular.

Figure 9:
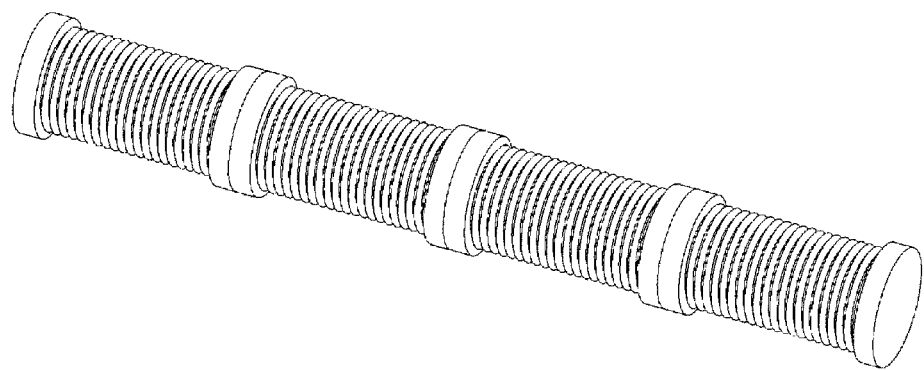
FIG. 9 is a view showing a plurality of uneven jigs arranged in a lateral direction.

The uneven jig functions as the support point for sufficiently stabilizing the thread guide of the strand in the X direction despite a simple mechanism, because filaments constituting the strand easily run a more stable valley portion (notched portion). As shown in FIG. 9, the uneven jigs of FIG. 1 are preferably connected to each other in the longitudinal direction, thus easily coping with the use of multiple spindles.

As the uneven jig used in the present invention, a height difference caused by the uneven portions is preferably about 0.01 to 10 times of the strand thickness. When the height difference of the uneven portions is smaller than the thickness of the strand, it is possible to suppress a change in local thickness in the width direction of the strand, in addition to stabilizing the thread guide. In contrast, when the height difference of the uneven portions is larger than the thickness of the strand, it is possible to more highly stabilize the thread guide. Since a great number of smaller fiber bundles is formed in the strand, the respective small fiber bundles (strands) are gathered and treated in the subsequent impregnating or cutting process. According to the manufacturing method of the present invention, such a result may be obtained that a plurality of fiber bundles thinner and smaller than the original strand is formed. The height difference of the uneven portions is preferably 0.01 mm to 20 mm, and more particularly 0.05 mm to 5 mm.

Such an uneven jig may have the shape of a roll or pin. Uneven portions may be formed on a surface of the fixed jig through which the strand passes. For example, the uneven jig preferably has the shape of a pin with rugged uneven portions, as shown in FIG. 1. When the uneven jig assumes a cylindrical shape such as the roll or pin, its diameter is preferably 5 mm to 900 mm, more preferably 10 mm to 200 mm, and particularly preferably 10 mm to 90 mm.

As long as the jig has the plurality of uneven portions including notched and protrusion portions on the thread guide, it is not limited to a particular cross-section. However, the jig preferably has a circular cross-section in view of an included angle or a high degree of freedom of the thread guide. The included angle is preferably in the range of 1° to 350°, and more preferably of 30° to 180°. This included angle can be easily adjusted by changing a distance between the jigs or a height of the jig.

The uneven jig used in the present invention requires a plurality of uneven portions. A pitch between the respective protrusion portions of the uneven portions is preferably 0.1 mm to 10 mm, and more particularly 5 mm or less. Further, the pitch between the protrusion portions is preferably ½ or less, more preferably ⅕ or less, and particularly preferably 1/10 or less, than the width of the reinforcing fiber strand before it is widened. A side angle of the protrusion portion is not limited to a particular angle, but is preferably 15° to 90°, and more particularly is in the range of 30° to 90°.

A top of the protrusion portion preferably has a curvature to prevent the reinforcing fiber from being damaged. A curvature radius R1 may vary depending on the width and interval of the uneven portions. The curvature radius R1 is preferably 0.01 mm to 30 mm, and particularly preferably 10 mm or less. Further, a curvature radius R2 of a top of the notched portion serving as a bottom of the uneven portion through which the strand passes may vary depending on the width and interval of the uneven portions. The curvature radius R2 is preferably in the range of 0.01 mm to 50 mm, and particularly preferably 30 mm or less.

The uneven jig of the present invention may entirely take the shape of a Japanese hand drum (more particularly, a small hand drum), and a small uneven portion may be formed in one large concave portion, so that it is possible to be used as a combination of the convergence jig and the uneven jig.

The material of uneven jig of the present invention is not limited to a special material, but is preferably a metal such as stainless steel, iron, and copper, or ceramics such as glass, alumina, and zirconia. The metal may be subjected to pearskin finish processing or polishing processing, and surface treatment such as chromium plating, and the ceramics may be coated with synthetic resin such as fluorine resin. Most preferably, hard chromium plating processing is performed on the stainless steel. Particularly, when fibers having high rigidity such as carbon fibers are used, it is particularly preferably used to improve the wear resistance of the jig for abrasion. Depending on the purpose, the surface may be subjected to mirror surface processing or pearskin finish processing. Further, the uneven jig is subjected to vibration such as ultrasonic vibration, heating or cooling, so that the uneven jig may be more suitably used.

In the manufacturing method of the present invention, the uneven jig of FIG. 1 for example is used to separate the strand consisting of the reinforcing fiber by the uneven portions, thus stabilizing the widening and keeping thread guide of the strand constant.

In the method for manufacturing the reinforcing fiber strand according to the present invention, the strand passes through the uneven jig and then the widening jig. The widening jig is not particularly limited as long as it can widen the strand. Generally, in view of the use of the multiple spindles and industrial production, the widening jig is preferably a jig (convex jig) having one gentle convex portion as shown in FIG. 2. The jig is a so-called drum-shaped (more particularly, Japanese drum shaped) jig. Such a jig is connected to another one in the longitudinal direction as shown in FIG. 10, thus easily coping with the use of the multiple spindles.

Such a widening jig may have the shape of a roll or pin. A convex portion may be formed on a surface of the fixed jig on which the fiber bundle (strand) passes. When the widening jig takes a cylindrical shape such as the roll or pin, the diameter of a maximum portion is preferably 5 mm to 900 mm, more preferably 10 mm to 200 mm, and particularly preferably 10 mm to 90 mm.

As long as the jig has the convex portion on the thread guide, it is not limited to a particular cross-section. However, the jig preferably has a circular cross-section in view of an included angle or a high degree of freedom of the thread guide. The included angle is preferably in the range of 1° to 350°, and more preferably of 30° to 180°. This included angle can be easily adjusted by changing a distance between the jigs or a height of the jig.

The convex portion has a larger diameter near the center of the jig, and is processed in the shape of a so-called large drum (more particularly, Japanese drum). The convex jig that is the widening jig having the convex portion has different diameters at a center and an end. The fibers tend to run on a route of the guide, in which the length of a path is decreased. Thus, since the fibers running on the center of the convex jig having a large diameter are apt to increase the path length, the fibers run on the route whose path length becomes short by spreading in the width direction, and thereby the strand is widened. Meanwhile, since the widening means that the fibers run on the route at an angle with the running direction of the strand, the path length becomes long if the angle is excessively large. Therefore, the fibers run on the route having the shortest path length, which keeps balance between both.

The convex portion preferably has an arc shape. In this case, its curvature radius R is preferably 10 mm to 900 mm, and more preferably in the range of 10 mm to 500 mm. If the curvature radius of the widening jig is excessively small, the widening is apt to become poor. If the curvature radius is excessively large, the strand tends to be insufficiently widened.

By setting the effective width of the widening jig, it is possible to adjust the width after the reinforcing fiber strand is widened. Moreover, it is possible to obtain the reinforcing fiber strand having a more stable quality, by using the jig such as a flat bar, pin, roll prescribing the effective width. In the manufacturing method of the present invention, the reinforcing fiber strand preferably passes through a thread-width controlling jig such as a pin guide or a roller having groove in which a control width is set, for example, after passing through the widening jig. By using the thread-width controlling jig, it is possible to adjust the width of the reinforcing fiber strand after being widened and besides to reduce a gap occurring in the reinforcing fiber strand after being widened.

The material of the widening jig of the present invention is not limited to a special material, but is preferably a metal such as stainless steel, iron, and copper, or ceramics such as glass, alumina, and zirconia. The metal may be subjected to pearskin finish processing or polishing processing, and the surface treatment such as chromium plating, and the ceramics may be coated with synthetic resin such as fluorine resin. Most preferably, hard chromium plating processing is performed on the stainless steel. Particularly, when fibers having high rigidity such as carbon fibers are used, it is particularly preferably used to improve the wear resistance of the jig for abrasion. Further, the widening jig is subjected to vibration such as ultrasonic vibration, heating or cooling, so that the widening jig may be more suitably used.

As described above, in the case of using the convex jig, since the path length of the fiber passing through the center is increased, the central portion of the strand tends to be thin after the strand is widened. Thus, the strand delivering distance L from the uneven jig in the width direction of the strand to the strand widening jig is established to be short, thus preventing the fiber of the central portion from excessively escaping out in the width direction, and thereby obtaining a widened strand having stably uniform thickness and width. Therefore, as shown in FIG. 8, it is very effective to substantially integrate the uneven jig in the strand width direction with the strand widening jig.

When the guide mechanism is disposed behind the widening jig, the guide mechanism functions as the support point of a downstream side so as to correct the trajectory of the deviated thread guide. The guide mechanism is not particularly limited as long as it acts as the support point of the downstream side, but may use a jig such as a flat bar, pin, or roll, for example. Particularly, similarly to the uneven jig in the strand width direction, it is preferable to use the fixed uneven jig having the uneven portions in the X direction. By using the uneven jig as the guide mechanism, it is easy for the filament constituting the strand to more stably run on the notched portion. Thus, the uneven jig functions sufficiently as the support point in the X direction despite the simple mechanism. The uneven jigs are preferably connected to each other in the longitudinal direction, thus easily coping with the use of the multiple spindles. Moreover, it is possible to keep the widening state more uniform even in the subsequent process. Further, in the case of using the uneven jig, since the uneven portions are disposed to generate unevenness in fiber density of the strand in the direction (X direction) perpendicular to the strand travelling direction, it has the effect of previously separating the strand including reinforcing fibers.

The reinforcing fiber bundle, which is previously separated, is particularly preferably used in a pellet obtained by immersing the resin in the widened state, performing convergence, solidifying the resin and then performing the cutting operation, or in a random mat made by dispersing the reinforcing fiber that is cut in the widened state. This is because it is particularly important that the stable width and thickness of the entire strand be obtained during the process.

Conventionally, when fibers are widened to be used in a reinforcing material as continuous fiber, it is important to keep the strand uniform without a gap. The reason is because the method of using the reinforcing fiber strand mainly uses a method of impregnating the strand with the matrix resin without any treatment. Therefore, the use of the uneven jig according to the present invention having the separating operation is generally avoided. This is because it has been thought that the reinforcing effect of the matrix resin is different between the portion of the composite material having the high fiber existence rate and the portion of the composite material having the low fiber existence rate and thereby poses a problem. However, in the case of being used in the above-mentioned pellet or random mat, a change in local thickness in the width direction of the strand has no problem. Particularly when the widened strand is cut to be used as the random mat, in order to reduce unevenness in the mat, on the contrary, it is effective to positively separate the strand and increase the number of fibers and fiber bundles. The use of the uneven jig according to the present invention is particularly preferable, because it has an action of separating the strand.

Figure 3:
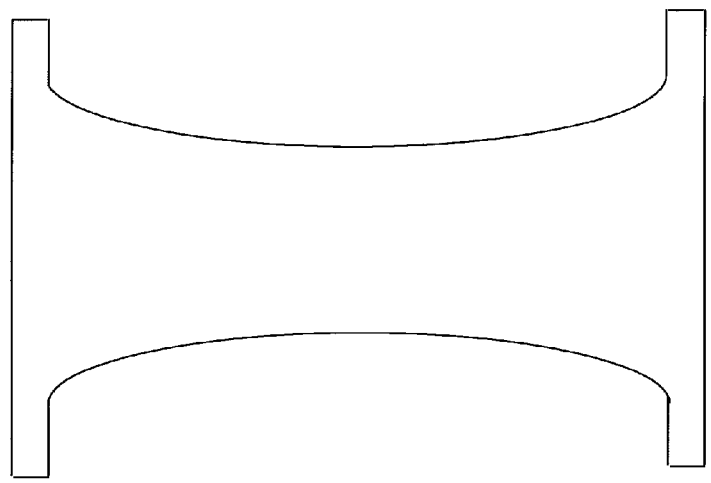
FIG. 3 is a schematic view showing a convergence jig.
Figure 11:
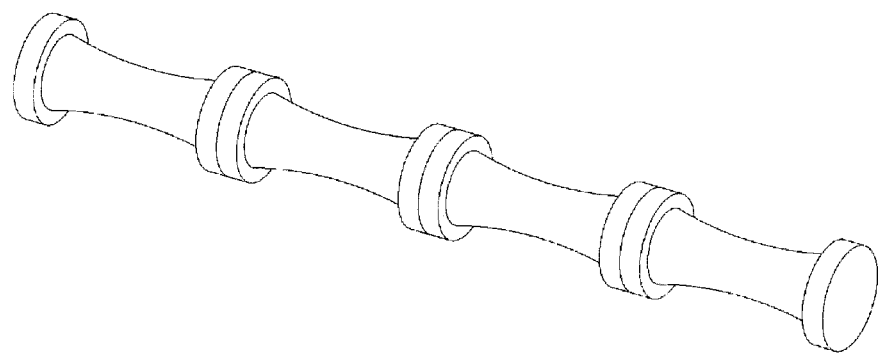
FIG. 11 is a view showing a plurality of convergence jigs (concave jigs) arranged in a lateral direction.

In the manufacturing method of the present invention, the strand preferably passes through the convergence jig before passing through the above-mentioned uneven jig or widening jig. Such a convergence jig is not limited particularly as long as it can fix the thread guide of the strand. For example, in view of the use of the multiple spindles and industrial production, the convergence jig is preferably a jig (concave jig) having a concave portion on a surface of a roll or pin on which the strand passes, as shown in FIG. 3. The jig is a so-called Japanese hand drum-shaped (more particularly, small hand drum shaped) jig. Such a jig is connected to another one in the longitudinal direction as shown in FIG. 11, thus easily coping with the use of the multiple spindles.

By previously passing through the convergence jig, the above-mentioned condition (i), "the center of the strand runs a position of X=0 on the widening jig" may be satisfied.

Thus, the strand passes through the more stable thread guide, so that it is possible to achieve a stable widening operation, and thereby the widened width of the finally obtained strand is also stabilized.

When the convergence jig takes the cylindrical shape such as the above-mentioned roll or pin, the diameter of a maximum portion is preferably 5 mm to 900 mm, more preferably 10 mm to 200 mm, and particularly preferably 10 to 90 mm.

As long as the jig has the concave portion on the thread guide, it is not limited to a particular cross-section. However, the jig preferably has a circular cross-section in view of an included angle or a high degree of freedom of the thread guide. The included angle is preferably in the range of 1° to 350°, and more preferably of 30° to 180°. This included angle can be easily adjusted by changing a distance between the jigs or a height of the jig.

The concave portion has a smaller diameter near the center of the jig, and is processed in the shape of a so-called Japanese hand drum (more particularly, small hand drum). The concave portion preferably has an arc shape. In this case, its curvature radius R is preferably 10 mm to 900 mm, and more preferably in the range of 10 mm to 500 mm.

If the curvature radius R is excessively small, the fiber is excessively converged. If the curvature radius R is excessively large, a position determining effect is deteriorated.

The material of the convergence jig of the present invention is not limited to a special material, but is preferably a metal such as stainless steel, iron, and copper, or ceramics such as glass, alumina, and zirconia. The metal may be subjected to pearskin finish processing or polishing processing, and surface treatment such as chromium plating, and the ceramics may be coated with synthetic resin such as fluorine resin. Most preferably, hard chromium plating processing is performed on the stainless steel. Particularly, when fibers having high rigidity such as carbon fibers are used, it is particularly preferably used to improve the wear resistance of the jig for abrasion. Further, the convergence jig is subjected to vibration such as ultrasonic vibration, heating or cooling, so that the convergence jig may be more suitably used.

In the convergence jig, the uneven jig, the widening jig, and the guide mechanism preferably used in the present invention, the effective width of each jig is set by controlling a range where fiber passes through "a flange" or the like on an end, thus allowing the width of the reinforcing fiber strand after being widened to be adjusted.

The convergence jig, the uneven jig, the widening jig, and the guide mechanism used in the present invention are preferably subjected to vibration such as ultrasonic vibration, heating or cooling in order to improve the widening characteristics of the strand and prevent the thread guide from being shaken. Various kinds of sizing agents are preferably supplied to the above-mentioned reinforcing fiber strand for the purpose of improving adhesion to a matrix material or of enhancing the convergence characteristics for the strand. By reducing the converging force through vibration, heating, and cooling, the strand can be effectively widened with a relatively small tension. But, if the converging force is excessively large, a large tension may be required to widen the strand to a desired width. Particularly, if the sizing agent contains solid resin components, the convergence jig, the uneven jig in the strand width direction, the widening jig, and the guide mechanism are preferably heated to a temperature, which is equal to or more than a softening temperature of the sizing agent and is less than a decomposition temperature thereof, and as a result the converging force of the sizing agent can be temporarily reduced during the process, thus leading to improvement in productivity. Meanwhile, when the sizing agent contains thermosetting resin components, a heating temperature is more preferably less than a hardening temperature. The heating temperature of the jig varies depending on the thermal deterioration of the strand itself, the contact time of the strand with each mechanism, and the components of the sizing agent. Generally, the heating temperature is preferably 50 to 300° C., and more preferably 70 to 250° C.

In the method for manufacturing the reinforcing fiber strand according to the present invention, the strand including reinforcing fibers sequentially runs while coming into contact with the uneven jig and the widening jig. By properly adjusting the contact length, the contact time, the thread guide, and the frictional coefficient of the jig and the strand, it is possible to properly optimize the tension or the widened state.

Generally, the line speed of the manufacturing method according to the present invention is preferably in the range of 1 to 500 m/min, and particularly preferably in the range of 2 m/min to 90 m/min. Further, the tension acting on the strand prior to being processed is preferably in the range of 0.098 N to 98 N (0.01 kgf to 10 kgf), and optimally 0.98 N (0.1 kgf) or more.

The reinforcing fiber strand obtained by the manufacturing method of the present invention is combined with a matrix resin to obtain a fiber-reinforced composite material by a known molding means and method, for example, injection molding, press molding, filament winding molding, resin transfer molding, autoclave molding, etc. The reinforcing fiber strand obtained by the manufacturing method of the present invention may be used as a reinforcing fiber material arranged by pulling such a reinforcing fiber strand in one direction or formed into woven or knitted fabric or non-woven fabric, multi-axial fabric, braid, etc.; or a chopped strand obtained by cutting the reinforcing fiber strand to a certain fiber length. More preferably, it may be used as a resin impregnated strand, a reinforcing fiber pellet or a random mat, and finally as a fiber-reinforced composite material. For example, in order to provide the resin impregnated strand, the widened reinforcing fiber strand is impregnated with thermoplastic resin or like, cooled and cut to become the reinforcing fiber pellet.

The matrix resin is not limited particularly, and may use thermosetting resin or thermoplastic resin.

The thermoplastic resin may include, for example, polyolefin resin such as polyethylene resin, polypropylene resin and a copolymer or blend thereof, aliphatic polyamide resin such as polyamide 66, polyamide 6, or polyamide 12, semi-aromatic polyamide resin having an aromatic component as an acid component, aromatic polyester resin such as polyethylene terephthalate resin (PET) or polybutylene terephthalate resin (PBT), polycarbonate resin, polystyrene resin (polystyrene resin, AS resin, ABS resin etc.), or aliphatic polyester resin such as polylactic acid. Among them, the polycarbonate resin, the aliphatic polyamide resin, and the polyolefin resin may be preferably used.

A specific example of the thermosetting resin may include epoxy resin, unsaturated polyester resin, phenol resin, vinylester resin, cyanicacid ester resin, urethane acrylate resin, phenoxy resin, alkyd resin, urethane resin, pre-polymerization resin of maleimide resin and cyanicacid ester resin, bismaleimide resin, polyimide resin and polyisoimide resin which have an acetylene terminal, polyimide resin having a nadic acid terminal, etc. One kind or two or more kinds of these may be used as a mixture. Among them, the epoxy resin or the vinylester resin, which are superior in heat resistance, elastic modulus, and chemical resistance, are particularly preferable. The thermosetting resin may contain a hardening agent, a hardening accelerator as well as a coloring agent or various additives that are widely used. The content of the resin composition included in the composite material is 10% by mass to 90% by mass, preferably 20% by mass to 60% by mass, and more preferably 25% by mass to 45% by mass.

Since the reinforcing fiber strand of the present invention is sufficiently widened and resin is easily impregnated, the composite material using them can obtain high physical properties.

Figure 4:
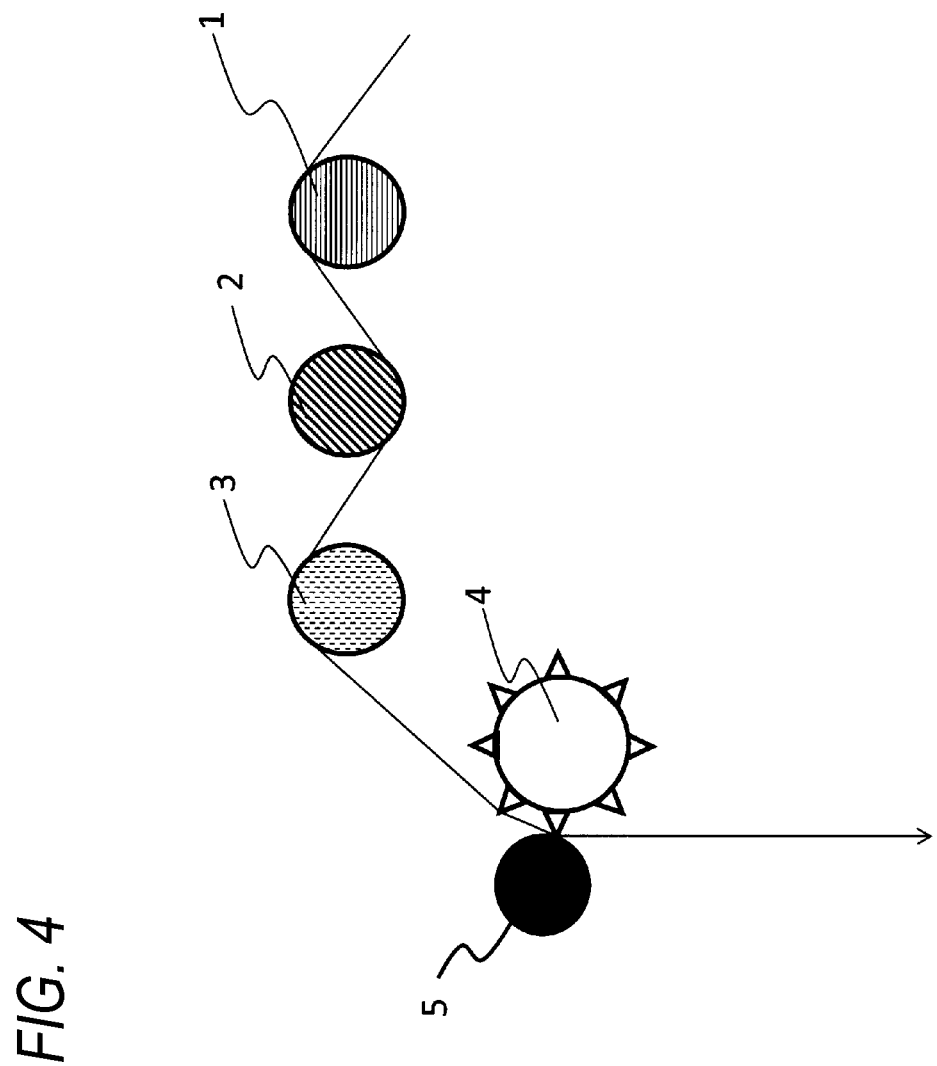
FIG. 4 is a schematic view showing a cut process combined in a method for manufacturing a reinforcing fiber strand according to the present invention.

Further, the reinforcing fiber strand of the present invention may be preferably used as the reinforcing fiber strand used to manufacture a random mat that is a quasi-isotropic non-woven substrate obtained by randomly orienting reinforcing fibers of a certain length. For example, this is used in the random mat obtained by undergoing the following process and the fiber-reinforced composite material using it, thus showing a particularly high effect (FIG. 4).

1. (cutting) the process of cutting a reinforcing fiber strand,
2. (dividing) the process of introducing the cut reinforcing fiber strand into a tube and spraying air onto the fiber strand, thus dividing the strand,
3. (fiber spraying) the process of spreading the divided reinforcing fiber strand (at the same time, it may be an applying process of absorbing fiber- or powder-type matrix resin and spraying both the reinforcing fibers and the matrix resin),
4. (fixation) the process of fixing applied reinforcing fibers and matrix resin, thus obtaining a random mat.
5. (press) the process of pressing the obtained random mat.

Particularly, the reinforcing fiber strand obtained by the manufacturing method of the present invention has regular unevenness in fiber density in the width direction resulting from the uneven jig processing, thus making it possible to obtain divided fiber strands having a particularly high quality in the discretely dividing process after the cutting process.

The matrix resin used in such a random mat is not limited particularly, but preferably uses a thermoplastic resin. The press may make a plurality of random mats, which are obtained in process 4 and then laminated each other, to a desired thickness. The method and condition of the press molding is not particularly limited. However, if the matrix resin is a thermoplastic resin, it is preferable to perform thermal pressing at the condition which is equal to or more than a melting point of the thermoplastic resin and is equal to or less than a decomposition temperature thereof. The press pressure and the press time may also be appropriately selected. The resin used in the random mat may be applied simultaneously with the above process 3. The resin film or molten resin may be superposed on the mat on which the fiber is sprayed, and then the subsequent fixation process 4 may be carried out.

The existing quantity of the matrix resin used in the random mat is preferably 50 to 1,000 parts by mass per 100 parts by mass of the reinforcing fibers. The matrix resin of 100 to 600 parts by mass per 100 parts by mass of the reinforcing fibers is more preferable, and the matrix resin of 150 to 300 parts by mass per 100 parts by mass of the reinforcing fibers is much more preferable.

Preferably, the thermoplastic resin suitable for the random mat may include a monomer, a copolymer, and a mixture of two or more kinds selected from the group consisting of, for example, vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acrylic resin, methacrylic resin, polyethylene resin, polypropylene resin, polyamide 6 resin, polyamide 11 resin, polyamide 12 resin, polyamide 46 resin, polyamide 66 resin, polyamide 610 resin, polyacetal resin, polycarbonate resin, polyethylene terephthalate resin, polyethylene naphthalate resin, polybutylene terephthalate resin, polyarylate resin, polyphenylene ether resin, polyphenylene sulfide resin, polysulfone resin, polyether sulfone resin, polyetheretherketone resin, etc. Among them, polypropylene resin, polyamide resin, polyethylene terephthalate resin, polyethylene naphthalate resin, polyetheretherketone resin, etc. are preferable.

The fiber reinforced composite material that is finally obtained using the reinforcing fiber strand of the present invention may contain, in addition to fibers used in the reinforcing fiber strand of the present invention, various fiber- or non-fiber type fillers made of inorganic fiber such as glass fiber or organic fiber, a fire retardant, a UV resistant agent, pigment, a release agent, a softener, a plasticizer, a surfactant and other additives, without departing from the scope of the present invention.

The method obtaining a shaped product that is a fiber-reinforced composite material using the random mat is not limited particularly, but press molding and thermal molding are preferable. Such a molding process may be performed in the shape of a final shaped product directly from the press molding process 5 in the process of manufacturing the random mat. Alternatively, this may be performed in the shape of a final shaped product by molding a pre-molded fiber-reinforced composite material in a shape that is easy to handle, for example, a plate shape, through the press molding, the thermal molding, or any molding method, in the press molding process 5.

To be more specific, it is possible to preferably obtain a shaped product through a so-called hot press. The random mat or pre-molded fiber-reinforced composite material is disposed in a mold, and then the press molding is performed while a temperature is raised to exceed the melting point or the glass transition point (the hardening temperature if the matrix resin is a thermosetting resin). Subsequently, the mold is cooled to a temperature less than the melting point or glass transition temperature.

When the matrix resin is a thermosetting resin, it is possible to preferably obtain a shaped product through a so-called cold press. The random mat or pre-molded fiber-reinforced composite material is heated to exceed the melting point or glass transition point. It may be used alone or a plurality of pieces may be overlapped according to the shape of a shaped body that is to be obtained. Subsequently, this is put into a mold that maintains a temperature less than the melting point or glass transition point, compressed and then cooled.

In the fiber-reinforced composite material using the reinforcing fiber strand obtained in the present invention, the impregnation of resin is sufficiently performed, thus providing a composite material that is high in physical properties and very efficient in workability and thus is very economic. Hence, since it is superior in mechanical physical properties and small in variation, it can be widely used for several purposes, for instance, sports, leisure, general industry, aerospace, automobiles, etc.

EXAMPLE

Hereinafter, the present invention will be described in detail with reference to working examples. The production of composite materials and the evaluation of the physical properties were done by the following method.

(Measurement of Width of Reinforcing Fiber Strand)

The width of a reinforcing fiber strand were measured at each of total 10 points using the caliper at an interval of 1 m in the longitudinal direction of the fibers, and the average for the 10 points was defined as the width of the reinforcing fiber strand.

(Production of Random Mat)

The reinforcing fiber strand was cut, using a rotary cutter, to the fiber length of 20 mm. The cut strand was introduced into a double tube manufactured by SUS304, and then was divided by spraying compressed air onto the strand at 150 m/sec. Subsequently, while the strand was spread, polyamide resin (PA6 powder, A1030FP manufactured by Unitika Limited) was supplied as a matrix resin. Thereby, after both the fibers and the resin were simultaneously sprayed, the polyamide resin was fixed to the fibers, thus creating the random mat.

(Method for Manufacturing Shaped Plate)

The random mats cut to a size of 350 mm×300 mm was laminated so that a thickness thereof was 5 mm after the molding process, and was thermally pressed for 3 minutes under the pressure of 4 MPa using a press machine heated to 260° C., thus obtaining the fiber-reinforced composite material shaped plate.

(Measurement of Tensile Strength)

A dumbbell-shaped specimen, which is 45 mm in width and 215 mm in length (a length between grippers is 115 mm and a width at a measured portion 25 mm), was prepared using the fiber-reinforced composite material shaped plate obtained by the above manufacturing method, according to JIS K 7164, and then was subjected to a tensile test at the test speed of 10 mm/min. The same test was repeated 10 times and standard deviation thereof was obtained as an index showing a degree of change in tensile strength.

Example 1

As a reinforcing fiber strand, a strand (the adhesion amount of a sizing agent of 1.0 wt %) were prepared by converging carbon fiber Tenax (trademark) (the average diameter of 7 μm, the number of filaments of 24,000, the tex of 1,600 tex, and the tensile strength of 4,000 MPa) available from TOHO TENAX Co., Ltd., using the sizing agent containing polyamide resin (softening point: 90° C.) as a main component, in a flat state having the width of 10 mm and the thickness of 0.15 mm.

The strand was processed under the condition that it passes sequentially through the following convergence jig, uneven jig, and widening jig at a line speed of 40 m/min and an average tension of 0.7 kgf (6.9 N) (measured by a load-cell type digital tension meter) before being widened (just before the convergence jig), and the strand was continuously conveyed from a strand feeding machine, thus obtaining the reinforcing fiber strand that was widened to the width of 20 mm. All of the convergence jig, the uneven jig, and the widening jig had the shape of a pin (cylinder), with their centers being arranged in a line. A center distance between the respective pins was 40 mm, and the included angle between the pin and the strand was about 70°. At this time, the value of L was 35 mm.

(Convergence Jig)

Its material was stainless steel treated by hard chromium plating, the effective width of the thread guide was 40 mm, one concave portion was present, the curvature radius R of the concave portion was 100 mm, and the diameter ($\Phi$) of the maximum portion of the convergence jig was 20 mm.

(Uneven Jig)

Its material was stainless steel, the effective width of the thread guide was 40 mm, a plurality of uneven portions was formed, the side angle ($\theta$) of the protrusion portion was 80°, the radius (R) of the top of the protrusion portion was 0.05 mm, the radius (R) of the bottom of the notched portion was 0.2 mm, the diameter of the uneven jig was 20 mm, the pitch between tops of neighboring protrusion portions was 1 mm, and the height of the protrusion portion (height difference of the uneven portion) was 0.6 mm.

(Widening Jig)

Its material was stainless steel, the effective width of the thread guide was 20 mm, one convex portion was present, the curvature radius R of the convex portion was 100 mm, and the diameter ($\Phi$) of the widening jig was 25 mm.

Immediately after the widening process was performed, the average tension was 1.5 kgf (14.7 N), and fibers were uniformly widened. The strand width after the strand was widened was 20 mm. A continuous operation was carried out for 2 hours, but a change in strand width after the strand was widened was not found although time passed.

Subsequently, the reinforcing fiber strand obtained in this way was cut and processed in the random mat including the fibers and the resin. Consequently, it was possible to obtain the random mat having good physical properties.

Example 2

Similarly to Example 1, the reinforcing fiber strand passed through the convergence jig, the uneven jig, and the widening jig in this order. Subsequently, it was treated by a flat pin having the control width of 18 mm, which was the thread width controlling jig (all the jigs included flat pins and were arranged in a line)

Immediately after passing through the flat pin, the average tension was slightly increased to be 1.6 kgf (15.7 N). However, it was possible to obtain the stabilized reinforcing fiber strand, in which fibers were more uniformly widened and the strand width after the strand was widened was 18 mm, as compared to Example 1. It was thought that the flat pin had the effect of reducing a gap by the uneven jig.

Subsequently, the reinforcing fiber strand obtained in this way was cut and processed in the random mat including the fibers and the resin. Consequently, it was possible to obtain the random mat having good physical properties.

Example 3

Similarly to Example 1, the reinforcing fiber strand passed through the convergence jig, the uneven jig, and the widening jig in this order. Subsequently, it was treated by the second uneven jig as a guide mechanism (all the jigs were arranged in a line). The second uneven jig was the same as the first uneven jig.

Immediately after passing through the second uneven jig, the average tension was increased to be 1.8 kgf (17.6 N). Although there were traces of separated fibers having the pitch of 1 mm, it was possible to obtain the stabilized reinforcing fiber strand, in which fibers were uniformly widened and the strand width after the strand was widened was 20 mm.

Subsequently, the reinforcing fiber strand obtained in this way was cut and processed in the random mat including the fibers and the resin. Consequently, it was possible to obtain the random mat having good physical properties, as in Example 1.

Example 4

The same process as in Example 1 was done except that the curvature radius R of the convex portion of the widening jig was changed from 100 mm of Example 1 to 300 mm. The average tension after the strand was widened was 1.6 kgf (15.7 N). Although the strand width of this example after the strand was widened is slightly worse than that of Example 1, it was possible to obtain the reinforcing fiber strand having a sufficiently high quality. The strand width after the strand was widened was 16 mm.

Subsequently, the reinforcing fiber strand obtained in this way was cut and processed in the random mat including the fibers and the resin. Consequently, it was possible to obtain the random mat having good physical properties.

Example 5

The same process as in Example 1 was done except that the sizing agent for the reinforcing fiber was changed from the polyamide resin to the urethane and the curvature radius R of the convex portion of the widening jig was 300 mm as in Example 4. The average tension after the strand was widened was 1.6 kgf (15.7 N), and fibers were uniformly widened. The strand width after the strand was widened was increased from 16 mm to 20 mm, so that the stabilized reinforcing fiber strand was obtained.

Subsequently, the reinforcing fiber strand obtained in this way was cut and processed in the random mat including the fibers and the resin. Consequently, it was possible to obtain the random mat having good physical properties, as in Example 1.

Example 6

The same process as in Example 1 was done except that the number of filaments of the reinforcing fiber was changed from 24,000 (24K) to 12,000 (12K) and the curvature radius R of the convex portion of the widening jig was 300 mm as in Example 4. The average tension after the strand was widened was 1.5 kgf (14.7 N), and fibers were uniformly widened. The strand width after the strand was widened was 20 mm, so that the stabilized reinforcing fiber strand was obtained.

Subsequently, the reinforcing fiber strand obtained in this way was cut and processed in the random mat including the fibers and the resin. Consequently, it was possible to obtain the random mat having good physical properties.

Comparative Example 1

The same process as in Example 1 was done except that no uneven jig was used. The average tension after the strand was widened was slightly increased to 1.6 kgf (15.7 N). However, the thread guide was unstable, and raw thread did not run through the center of the widening pin after passing through the convergence jig, so that it was impossible to obtain the stable widening effect. Since the thread guide was changed, it was impossible to obtain a desired strand width.

Subsequently, the reinforcing fiber strand obtained in this way was cut and processed in the random mat including the fibers and the resin. However, only the reinforcing fiber strand having the same physical properties as that which did not undergo the widening process was obtained. The standard deviation for the tensile strength of the fiber-reinforced composite material shaped plate obtained by molding the above random mat was 40, so that it was large, and thereby a change in strength was large. As a result, a non-uniform shaped plate was obtained.

Comparative Example 2

The same process as in Example 1 was done except that a cylindrical flat bar having the diameter Φ of 20 mm and made of stainless steel subjected to hard chromium plating was used, instead of the uneven jig. The average tension after the strand was widened was increased to 1.7 kgf (16.7 N). Further, the thread guide was unstable, and raw thread did not run through the center of the widening pin after passing through the convergence jig, so that it was impossible to obtain the stable widening effect. Since the width of the obtained strand was 13 mm and was narrower than the strand obtained when using the uneven jig, it was impossible to obtain a sufficient widening effect.

Subsequently, the reinforcing fiber strand obtained in this way was cut and processed in the random mat consisting of the fiber and the resin. However, only the reinforcing fiber strand having the same physical properties as that which did not undergo the widening process was obtained. The standard deviation for the tensile strength of the fiber-reinforced composite material shaped plate obtained by molding the above random mat was 37, so that it was large, and thereby a change in strength was large. As a result, a non-uniform shaped plate was obtained.

Example 7

The same process as in Example 1 was done except that the interval between the tops of the protrusion portions of the uneven jig was changed from 1 mm of Example 1 to 6 mm. The average tension after the strand was widened was 1.3 kgf (12.7 N). The strand width after the strand was widened was slightly lower than that of Example 1, but it was possible to obtain the reinforcing fiber strand of a sufficiently high quality. The strand width after the strand was widened was 16 mm.

Subsequently, the reinforcing fiber strand obtained in this way was cut and processed in the random mat including the fibers and the resin. Consequently, it was possible to obtain the random mat having good physical properties.

Example 8

The same process as in Example 1 was done except that the height of the protrusion portion of the uneven jig was changed from 0.6 mm of Example 1 to 1.8 mm. The average tension after the strand was widened was 1.7 kgf (16.7 N). The strand width after the strand was widened was slightly lower than that of Example 1, but it was possible to obtain the reinforcing fiber strand of a sufficiently high quality. The strand width after the strand was widened was 15 mm.

Subsequently, the reinforcing fiber strand obtained in this way was cut and processed in the random mat including the fibers and the resin. Consequently, it was possible to obtain the random mat having good physical properties.

Example 9

Similarly to Example 1, the reinforcing fiber strand passed through the convergence jig, the uneven jig, and the widening jig in this order. Subsequently, it was continuously treated by the cylindrical flat bar as a guide mechanism, the flat bar being made of stainless steel subjected to hard chromium plating and having the diameter Φ of 20 mm (all the jigs were arranged in a line). Immediately after passing through the flat bar, the average tension was 1.7 kgf (16.7 N), and the strand width after the strand was widened was 20 mm, so that it was possible to obtain the stabilized reinforcing fiber strand.

Subsequently, the reinforcing fiber strand obtained in this way was cut and processed in the random mat including the fibers and the resin. Consequently, it was possible to obtain the random mat having good physical properties, as in Example 1.

Example 10

The same process as in Example 1 was done except that the sizing-agent adhesion amount of the reinforcing fiber used was changed from 1 wt % to 5 wt %. The average tension after the strand was widened was 1.6 kgf (15.7 N). The fibers were uniformly widened and the strand width after the strand was widened was 16 mm, so that it was possible to obtain the stable reinforcing fiber strand.

Subsequently, the reinforcing fiber strand obtained in this way was cut and processed in the random mat including the fibers and the resin. Consequently, it was possible to obtain the random mat having good physical properties, as in Example 1.

Example 11

The same process as in Example 1 was done except that the diameter Φ of each of the convergence jig, the uneven jig, and the widening jig was changed to 90 mm. The centers of the convergence jig, the uneven jig, and the widening jig were arranged in a line, the center distance between the respective pins was 100 mm, the included angle between the pin and the strand was about 140°, and the value of L was 35 mm. The average tension after the strand was widened was 2.0 kgf (19.6 N), the fibers were uniformly widened and the strand width after the strand was widened was 22 mm, so that it was possible to obtain the stable reinforcing fiber strand.

Subsequently, the reinforcing fiber strand obtained in this way was cut and processed in the random mat including the fibers and the resin. Consequently, it was possible to obtain the random mat having good physical properties. The standard deviation for the tensile strength of the fiber reinforced composite material shaped plate obtained by molding the above random mat was 18, so that it was small, and thereby a change in strength was small. As a result, it was possible to obtain a shaped plate having the uniform shape and physical properties.

Example 12

The same process as in Example 1 was done except that a bar heater (Φ 12 mm) was inserted into a side of each of the convergence jig, the uneven jig, and the widening jig so that the temperature of each jig was 120° C. The average tension after the strand was widened was 1.8 kgf (17.6 N), the fibers were uniformly widened and the strand width after the strand was widened was 21 mm, so that it was possible to obtain the stable reinforcing fiber strand.

Subsequently, the reinforcing fiber strand obtained in this way was cut and processed in the random mat including the fiber and the resin, as in example 1. Consequently, it was possible to obtain the random mat having good physical properties. The standard deviation for the tensile strength of the fiber reinforced composite material shaped plate obtained by molding the above random mat was 19, so that it was small, and thereby a change in strength was small. As a result, it was possible to obtain a shaped plate having the uniform shape and physical properties.

Example 13

The same process as in Example 3 was done except that a bar heater (Φ 12 mm) was inserted into a side of each of the convergence jig, the uneven jig, and the widening jig so that the temperature of each jig was 120° C. On the other hand, no bar heater was used in the second uneven jig. The average tension after the strand was widened was 1.8 kgf (17.6 N), the fibers were uniformly widened and the strand width after the strand was widened was 21 mm, so that it was possible to obtain the stable reinforcing fiber strand.

Subsequently, the reinforcing fiber strand obtained in this way was cut and processed in the random mat including the fibers and the resin, as in example 1. Consequently, it was possible to obtain the random mat having good physical properties. The standard deviation for the tensile strength of the fiber reinforced composite material shaped plate obtained by molding the above random mat was 19, so that it was small, and thereby a change in strength was small. As a result, it was possible to obtain a shaped plate having the uniform shape and physical properties.

Example 14

The same process as in Example 13 was done except that the diameter Φ of each of the convergence jig, the uneven jig, the widening jig and the second uneven jig was changed to 90 mm, and the center distance between the respective pins was 200 mm so that the value of L was changed to 180 mm. The centers of the convergence jig, the uneven jig, and the widening jig were arranged in a line, and the included angle between the pin and the strand was 50°. The average tension immediately after the widening process was 1.5 kgf (14.7 N), the fibers were uniformly widened and the strand width after the strand was widened was 16 mm. While a continuous operation was done for 2 hours, there was no change in strand width after the strand was widened even if time passed.

Subsequently, the reinforcing fiber strand obtained in this way was cut and processed in the random mat including the fibers and the resin. Consequently, it was possible to obtain the random mat having good physical properties. The standard deviation for the tensile strength of the fiber reinforced composite material shaped plate obtained by molding the above random mat was 25, so that it was small, and thereby a change in strength was small. As a result, it was possible to obtain a shaped plate having the uniform shape and physical properties.

Example 15

The uneven and widening jigs used in example 14 were divided into halves, and then their sections were matched with each other, so that the uneven and widening jigs substantially integrated with each other as shown in FIG. 8 were prepared. The same process as in Example 14 was done except that the center distance between the integrated jigs and each jig (the convergence jig and the second uneven jig)

was 110 mm (the included angle between the jig and the strand was about 110°). That is, in this Example 15, the delivering distance L between the uneven jig and the widening jig was 0 mm. The average tension immediately after the widening process was 1.6 kgf (15.7 N), the fibers were uniformly widened and the strand width was 20 mm after the widening operation. While a continuous operation was done for 2 hours, an incident angle of the strand to the widening jig was almost zero, and there was no change in strand width after the strand was widened even if time passed.

Subsequently, the reinforcing fiber strand obtained in this way was cut and processed in the random mat including the fibers and the resin. Consequently, it was possible to obtain the random mat having good physical properties. The standard deviation for the tensile strength of the fiber reinforced composite material shaped plate obtained by molding the above random mat was 17, so that it was small, and thereby a change in strength was small. As a result, it was possible to obtain a shaped plate having the uniform shape and physical properties.

Example 16

The same process as in Example 14 was done except that the center distance of each of the convergence jig, the uneven jig, the widening jig and the second uneven jig was set to be 250 mm so that the value of L was changed to 240 mm (24 times of the fiber strand width). The centers of the convergence jig, the uneven jig, and the widening jig were arranged in a line, and the included angle between the pin and the strand was 45°. The reinforcing fiber strand widened up to about 15 mm as a whole was obtained. Immediately after the widening process, the average tension was 1.6 kgf (15.7 N), and the incident angle to the widening jig was slightly unstable. However, after the widening operation, it was possible to obtain the reinforcing fiber strand having the strand width of 15 mm.

Subsequently, the reinforcing fiber strand obtained in this way was cut and processed in the random mat including the fibers and the resin, as in Example 1. Consequently, it was possible to obtain the random mat having good physical properties. The standard deviation for the tensile strength of the fiber reinforced composite material shaped plate obtained by molding the above random mat was 27, so that it was small, and thereby a change in strength was small. As a result, it was possible to obtain a shaped plate having the uniform shape and physical properties.

INDUSTRIAL APPLICABILITY

The present invention provides a method for manufacturing a reinforcing fiber strand, which uses a simple mechanism and by which the strand is stably widened under a high-speed processing condition.

Although the present invention has been described in detail with reference to specific embodiments, it is to be appreciated that those skilled in the art can change or modify the embodiments without departing from the scope and spirit of the present invention.

This application claims the priority of Japanese Patent Application (Japanese Application No. 2011-281507) filed on Dec. 22, 2011, the disclosure of which is incorporated herein by reference.

The invention claimed is:

1. A method for manufacturing a reinforcing fiber strand, wherein a strand including reinforcing fibers passes through an uneven jig and a widening jig in this order, the uneven jig including a plurality of uneven portions having notched and protrusion portions which are disposed to generate unevenness in fiber density of the strand in a direction perpendicular to a strand travelling direction, and the strand is divided by the protruding portions.

2. The method for manufacturing a reinforcing fiber strand according to claim 1, wherein the uneven jig is a jig having an uneven portion of a height that is 0.01 to 10 times of a strand thickness.

3. The method for manufacturing a reinforcing fiber strand according to claim 1, wherein a strand delivering distance (L), which is a distance between the uneven jig and the widening jig, satisfies the following Inequality (1):

$$L \leq 20 \times W \qquad (1)$$

wherein L is the strand delivering distance (mm) between the uneven jig and the widening jig, and W is a fiber strand width (mm) before the strand is widened.

4. The method for manufacturing a reinforcing fiber strand according to claim 1, wherein the strand passes through a convergence jig before the uneven jig.

5. The method for manufacturing a reinforcing fiber strand according to claim 1, wherein the widening jig has one convex portion.

6. The method for manufacturing a reinforcing fiber strand according to claim 1, wherein the strand passes through a second uneven jig after the widening jig.

7. The method for manufacturing a reinforcing fiber strand according to claim 1, wherein the reinforcing fibers comprise carbon fibers.

8. The method for manufacturing a reinforcing fiber strand according to claim 1, wherein a strand width before the strand is widened ranges from 1 mm to 300 mm.

9. The method for manufacturing a reinforcing fiber strand according to claim 1, wherein the uneven jig comprises a roll or a pin.

10. The method for manufacturing a reinforcing fiber strand according to claim 4, wherein the convergence jig has one concave portion.

* * * * *